Dec. 4, 1951  L. E. NORTON  2,577,146
METHOD OF AND SYSTEM FOR MODULATING MICROWAVE ENERGY
Filed May 28, 1948
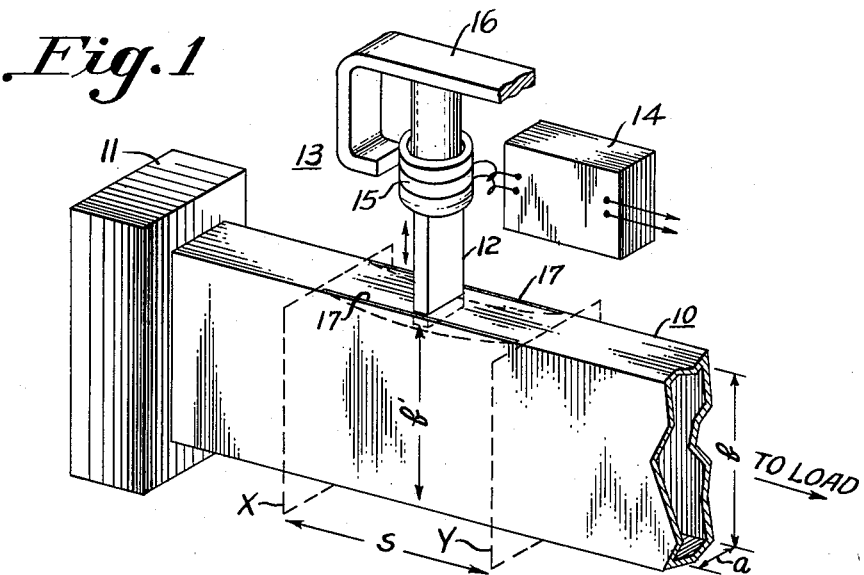
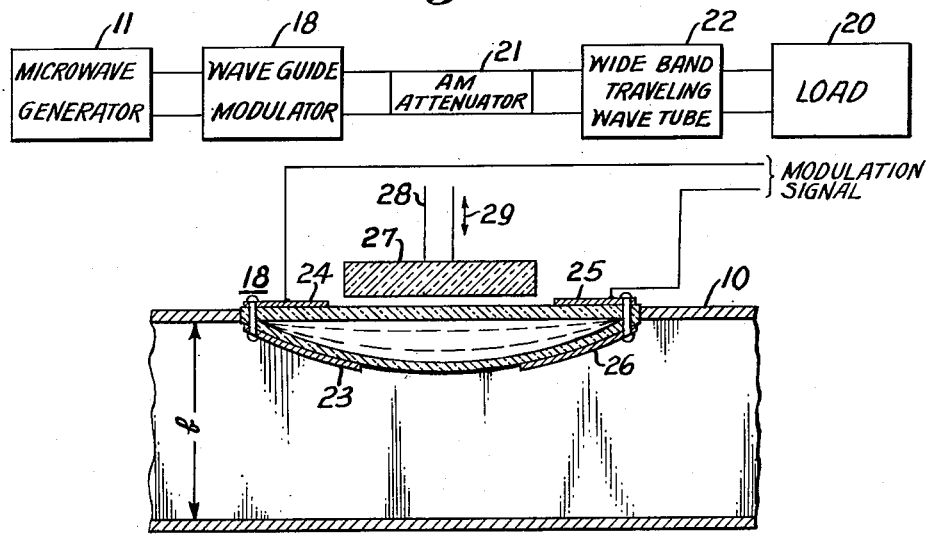
INVENTOR
Lowell E. Norton
BY
ATTORNEY Patented Dec. 4, 1951

2,577,146

UNITED STATES PATENT OFFICE

2,577,146

METHOD OF AND SYSTEM FOR MODULATING MICROWAVE ENERGY

Lowell E. Norton, Princeton Junction, N. J., assignor to Radio Corporation of America, a corporation of Delaware Application May 28, 1948, Serial No. 29,835

8 Claims. (Cl. 332—18)

This invention relates to methods of and systems for producing modulated microwave energy, and particularly concerns arrangements for effecting frequency or phase-modulation of microwave energy produced by magnetrons, klystrons and like microwave tube generators.

In accordance with the present invention, modulation of microwave energy is effected by variation of its wavelength during its propagation through a waveguide: more specifically, the modulation is effected by varying the cut-off frequency of the waveguide in accordance with the desired modulation correspondingly to vary the phase velocity of the energy in the waveguide.

In some forms of the invention, the cut-off dimension of the waveguide is varied by an electromechanical actuator which flexes or deforms a metallic wall of the guide; whereas in other forms of the invention, the cut-off dimension is effectively varied by modulating an electric field which affects the position or shape of an ionized gas serving as a flexible or deformable wall-section of the guide.

Preferably, the normal cut-off frequency of the guide is fairly close to and higher than the frequency of the impressed unmodulated energy to attain enhanced frequency-modulation and minimized amplitude-modulation, the cut-off frequency being varied in accordance with the desired modulation within limits higher than the normal cut-off frequency. Furthermore, the amplitude-modulation may be attenuated or further minimized by inclusion in the transmission path beyond the modulating means of a mass of energy-absorptive material having a rising frequency/absorption characteristic.

Further in accordance with the invention, there may be included in the transmission path beyond the modulating means and also beyond the amplitude-modulation attenuator, if used, a wideband travelling-wave tube for amplification of the frequency-modulated microwave energy.

The invention further resides in the methods, systems and devices having the features of novelty hereinafter described and claimed.

For a more detailed understanding of the invention, reference is made to the accompanying drawings in which:

Figure 1 illustrates one modification of the invention utilizing a waveguide whose cut-off dimension is varied by an electromechanical modulator;

Figure 2 is a cross section of a waveguide whose cut-off dimension is varied by an ionizing field; and Figure 3 is a block diagram of a system utilizing the waveguide modulators of Figure 1 or 2.

The relation between the wavelength of microwave energy as propagated in free space and the wavelength of the same energy, or energy of the same frequency, as propagated in a waveguide can be expressed as $$(1) \qquad \lambda_g = \frac{\lambda_0}{\sqrt{1-\left(\frac{\lambda_0}{\lambda_c}\right)^2}}$$

where $\lambda_g$ = wavelength in the guide
$\lambda_0$ = wavelength in free space
$\lambda_c$ = cut-off frequency of the waveguide.

The above equation is valid for every mode in any waveguide of any cross section provided the value of $\lambda_c$ corresponds to the mode and cross section being used. For simplicity of explanation, however, further discussion will be concerned with a rectangular waveguide 10, Figures 1 and 2, operated at its dominant or TE$_{1,0}$ mode and having an internal width "b."

When the free space wavelength $\lambda_0$ of energy impressed on the waveguide 10 as by microwave generator 11 of any suitable type, is much smaller than 2b, the guide wavelength $\lambda_g$ of the same energy is approximately equal to the free space wavelength $\lambda_0$. However, as the frequency of the microwave energy is further and further decreased so that its free space wavelength $\lambda_0$ approaches 2b, its wavelength $\lambda_g$ within the guide increases rapidly without bounds.

If the frequency is still further decreased so that its free space wavelength is greater than 2b, propagation along the guide becomes non-existent: in other words, the cut-off wavelength $\lambda_c$ of the TE$_{1,0}$ mode of the rectangular waveguide 10 is 2b so that for this case equation 1 may be rewritten as $$(2) \qquad \lambda_g = \frac{\lambda_0}{\sqrt{1-\left(\frac{\lambda_0}{2b}\right)^2}}$$

The lesser dimension "a" of the rectangular guide 10 is not critical and is usually about half the cut-off dimension "b."

In accordance with the invention, the guide wavelength $\lambda_g$ of the impressed energy from generator 11 is varied in accordance with the desired modulation by correspondingly varying the cut-off dimension "b" of a section of the waveguide. Specifically, in the modification shown in Figure 1, one of the narrow walls of the guide is mechanically connected, as by bar 12, to the movable element of a transducer 13 energized by the output of an amplifier 14 whose input terminals are connected to a microphone or other pickup device actuated in accordance with the intelligence to be superimposed upon the microwave energy. In the particular arrangement shown in Figure 1 by way of example, the transducer 13 is similar to the dynamic type of loudspeaker and comprises a movable voice coil 15 energized by the output of amplifier 14 and a stationary field magnet 16 which may be either of the permanent magnet or electromagnetic type. The movement of the voice coil 15 is transmitted to the waveguide to flex or deform it and so change its cut-off dimension "b" in accordance with the modulation-frequency input to the voice coil. For attainment of a suitably high modulation factor, the narrow wall attached to bar 12 should be suitably thin to function as a membrane or diaphragm, and additionally if desirable or necessary, the flexed face of the guide may be slotted, as indicated at 17, along its opposite edges and for appreciable distance on either side of the driving bar 12.

Assuming for simplicity that the input to the driving coil 15 is a single sinusoidal frequency, the variation of the cut-off dimension with time may be expressed as (3) $$b' = b(1 + m \sin \alpha t)$$

where $m$ = mechanical modulation factor.

The guide wavelength as varied in accordance with the modulation may therefore be expressed as (4) $$\lambda_g = \frac{\lambda_0}{\sqrt{1 - \left[\frac{\lambda_0}{2b(1+m \sin \alpha t)}\right]^2}}$$

Thus, although the generator 11 supplies the waveguide with energy of constant wavelength, the wavelength of the energy within the guide beyond the modulator section continuously varies in accordance with the change in cut-off frequency of the guide as effected by the transducer 13 or equivalent.

In further explanation of this phenomenon, at a reference plane X in advance of the modulator section of the waveguide, the energy impressed thereon by the generator 11 of constant frequency may be expressed as (5) $$e = E \sin w_0 t$$

whereas at a reference plane Y at a distance S beyond plane X and beyond the transducer 13, the energy within the guide may be expressed as (6) $$e_1 = E \sin \left(w_0 t - \frac{2\pi S}{\lambda_g}\right)$$

The phase of the energy in plane Y with respect to the constant phase of energy in plane X may therefore be expressed as (7) $$\phi = -\frac{2\pi S}{\lambda_g}$$

or $$\phi = -\frac{2\pi S}{\lambda_0} \sqrt{1 - \left[\frac{\lambda_0}{2b(1+m \sin \alpha t)}\right]^2}$$

The instantaneous frequency of $e_1$ is expressed as (8) $$f = \frac{W_0}{2\pi} - \frac{\pi S \lambda_0 m \cos \alpha t}{2b^2(1+\sin \alpha t)^3 \sqrt{1 - \left[\frac{\lambda_0}{2b(1+m \sin \alpha t)}\right]^2}}$$

Usually, the modulation factor "$m$" is very much less than unity so that the instantaneous frequency of $e_1$ may be more simply expressed as (9) $$f \simeq \frac{w_0}{2\pi} - \frac{\pi S \lambda_0 \cos \alpha t}{2b^2 \sqrt{1 - \left(\frac{\lambda_0}{2b}\right)^2}}$$

from which it appears that the instantaneous frequency is an approximately linear function of the modulation.

Preferably, the frequency of generator 11 is chosen to be fairly near the normal cut-off frequency of wave guide 10 (that is, the ratio of the free space wavelength to twice the cut-off dimension $b$ is selected to be somewhat greater than unity), but not so close as to produce large amplitude-variation of the microwave energy in the guide. Under this circumstance, the term $$\sqrt{1 - \left(\frac{\lambda_0}{2b}\right)^2}$$

of Equation 9 is vanishingly small and the instantaneous frequency changes of the energy at plane Y beyond the modulator are large for any given change in the cut-off frequency as effected by transducer 13. By way of example, the ratio of $\lambda_0$ to $2b$ (expressed in the same units of length) should preferably be within the range of from about $\sqrt{1/2}$ to about $\sqrt{9/10}$ to measure enhancement of the frequency-modulation and minimization of the amplitude-modulation and the optimum of about $\sqrt{8/10}$. As the foregoing term appears in the denominator of Equation 9, a large modulation index or incremental frequency shift is readily attainable for slight mechanical displacement of the waveguide wall.

The waveguide modulation arrangement shown in Figure 1 using an electrodynamic type of driving unit to flex the metal wall of the waveguide is well suited when the modulation is at audio frequencies, but is not satisfactory when the modulation-frequencies are in the video range as used, for example, in television. The modified form of waveguide modulator shown in Figure 2 is suited for modulating the microwave energy at audio, video or higher frequencies. The gas cell 18 of suitable low-constant dielectric, such as polystyrene, or the like, contains a small volume of a gas, such as neon or mercury which is ionized by a direct-current field or an alternating field whose frequency is much lower than the lowest modulating frequency. The field-producing electrodes 23, 24, 25, 26 are so shaped and located, with respect to a high dielectric constant titanate dielectric element 27 located above the gas chamber 18, that the gas is ionized in a thin sheet 19 serving as a continuation of the waveguide wall in which the gas cell 18 is introduced. The modulating frequency voltage applied to the focusing electrodes causes the ionized sheet of gas 19 to move up and down in the direction of the cut-off dimension "b" between the upper limit indicated by the dash-line position and the lower limit indicated by the dot-dash position. In effect, the ionized sheet of gas is a substantially weightless membrane or diaphragm which is vibrated in accordance with the modulated frequencies to vary the cut-off dimension "b" of the waveguide, generally as above described in discussion of Figure 1.

The position of the high constant dielectric element 27 can be adjusted by the actuator 28 as indicated by the arrow 29 to determine the range of motion of the ionized sheet 19 in response to modulating potentials applied to the electrodes 23, 24 and 25, 26. If desired the actuator 28 may be actuated by a movable armature responsive to the modulation signals as in Figure 1 and the gas electrodes maintained at fixed potentials.

As with the waveguide modulator of Figure 1, the carrier frequency as supplied by generator 11 is so selected with respect to the normal cut-off frequency of the waveguide that the frequency-modulation effects are enhanced and the amplitude-modulation effects minimized. With either type of modulator device, or its equivalent, the amplitude variations incident to variation of the cut-off frequency may be further reduced by including in the transmission path beyond the waveguide modulator, generally as shown in Figure 3, a suitable mass 21 of energy-absorptive material, such as magnetite, Bakelite, barium titanate or the like, which has a rising absorption/frequency characteristic. Thus, the microwave energy as transmitted to the antenna or other load 20 is substantially free of amplitude-modulation.

For some applications where it is necessary or desirable to increase the output beyond the attenuator 21, there may be included in the transmission line a wide-band travelling-wave tube 22 such as disclosed in Lindenblad U. S. Patent 2,300,052 granted October 27, 1942, or as described in the Proceedings of the Institute of Radio Engineers, volume 35, No. 2, pages 111–127.

From the foregoing it will be evident to those skilled in the art that the method of effecting modulation of microwave energy above described is not limited to rectangular waveguides or to waveguides operated in their dominant mode. From the general principles above explained and the specific examples given, applications of this method of modulation to waveguides of other cross sections and operated in other modes should be evident to those skilled in the art and are comprehended by appended claims.

I claim as my invention:

1. The method of linearly frequency-modulating microwave energy propagated through a waveguide at least one of whose walls comprises a sheet of ionized gas which comprises supplying the unmodulated energy to said waveguide, and varying the ionizing field of said gas in accordance with the desired modulation correspondingly to vary linearly the cut-off dimension of the waveguide.

2. The method of linearly frequency-modulating microwave energy propagated through a waveguide at least one of whose walls comprises a thin gas chamber which comprises supplying the unmodulated energy to said waveguide, applying an electric field to the gas to form a thin ionized sheet of gas, and varying said electric field in accordance with the desired modulation correspondingly to deform said ionized sheet and accordingly to vary linearly the phase-velocity of the microwave energy during its propagation through the waveguide.

3. The method of linearly frequency-modulating microwave energy propagated through a waveguide which comprises supplying the unmodulated energy to said waveguide, varying the cut-off dimension of the waveguide in accordance with the desired modulation so to vary linearly the phase velocity and the amplitude of the energy during its propagation in the waveguide, and absorbing a portion of the modulated energy in a manner coefficient increasing with frequency to minimize the amplitude-modulation effects.

4. A waveguide linear frequency-modulator for microwave energy dimensioned to have its cut-off frequency higher than the carrier frequency of said energy, a gas cell included in a wall of the waveguide, electric field-producing means ionizing the gas to form a thin sheet thereof serving as part of said wall, and means for varying the gas-ionizing field linearly in accordance with the desired modulation to shift the position of said gas-sheet and so to vary the cut-off frequency of the waveguide.

5. A system for producing linearly frequency-modulated microwave energy comprising a microwave generator operating at fixed frequency, a waveguide for transmitting the microwave energy produced by said generator, and modulating means for varying linearly the cut-off dimension of said waveguide in accordance with the desired modulation, said waveguide being so dimensioned that its normal cut-off frequency is higher than said fixed frequency to an extent enhancing the frequency-modulation and minimizing the amplitude-modulation of said energy effected by aforesaid variation of the cut-off dimension.

6. A system for producing linearly frequency-modulated microwave energy comprising a microwave generator for operating at a chosen fixed frequency, a transmission path including a waveguide for transmission of microwave energy produced by said generator, modulating means for varying the cut-off dimension of said guide so to vary linearly the phase velocity and the amplitude of said energy, and means for attenuating the amplitude-modulation comprising in said path beyond said modulating means a mass of absorptive material having a rising frequency/absorption characteristic.

7. A system for producing linearly frequency-modulated microwave energy comprising a microwave generator for operation at a chosen fixed frequency, a transmission path including a waveguide for transmitting microwave energy produced by said generator, modulating means for varying the cut-off dimension of said guide to vary linearly the wavelength of said energy in the guide in accordance with the desired modulation, and a wide-band travelling-wave tube in said path beyond said modulating means for amplification of the modulated microwave energy.

8. A system for producing linearly frequency-modulated microwave energy comprising a microwave generator for operation at a chosen fixed frequency, a transmission path including a waveguide for transmitting microwave energy produced by said generator, modulating means for varying the cut-off dimension of said guide so to vary linearly the phase velocity and amplitude of said energy, means for attenuating the amplitude-modulation comprising in said path beyond said modulating means a mass of absorptive material having a rising frequency/absorption characteristic, and a wide-band travelling-wave tube in said path beyond said attenuating means for amplification of the velocity-modulated energy.

LOWELL E. NORTON.

REFERENCES CITED

The following references are of record in the file of this patent:

UNITED STATES PATENTS

| Number | Name | Date |
|---|---|---|
| 2,106,770 | Southworth et al. | Feb. 1, 1938 |
| 2,189,584 | Hollmann | Feb. 6, 1940 |
| 2,217,280 | Koch | Oct. 8, 1940 |
| 2,408,425 | Jenks et al. | Oct. 1, 1946 |
| 2,426,992 | Folland et al. | Sept. 9, 1947 |
| 2,438,832 | Turner | Mar. 30, 1948 |
| 2,442,614 | Norton | June 1, 1948 |
| 2,461,005 | Southworth | Feb. 8, 1949 |
| 2,483,818 | Evans | Oct. 4, 1949 |
| 2,511,106 | Fredholm et al. | June 13, 1950 |